April 21, 1953    J. W. BITLER    2,635,727
ADJUSTING MECHANISM FOR CONTROL DEVICES
Filed Aug. 6, 1948

INVENTOR
JOHN W. BITLER
BY *Toulmin & Toulmin*
ATTORNEYS

Patented Apr. 21, 1953

2,635,727

UNITED STATES PATENT OFFICE 2,635,727

ADJUSTING MECHANISM FOR CONTROL DEVICES

John W. Bitler, Minster, Ohio, assignor to The Minster Machine Company, Minster, Ohio, a corporation of Ohio Application August 6, 1948, Serial No. 42,970

2 Claims. (Cl. 192—67)

This invention relates to control mechanisms for regulating the time cycle of other controlled devices, and particularly relates to an adjusting mechanism that is adapted to adjust the operating time cycle of the control mechanism relative to the operating cycle of the device that is controlled so that the control device can cause a particular operation of the controlled device at a particular point in the cycle of operation of the controlled cycle of operation at which the control will cause the controlled device to function.

More particularly, it is an object of the invention to provide a control device for a machine, such as a punch-press, which is adapted to control the upward and downward movements of the platen of the press, and to provide for adjustment of the control device so that the platen of the press can be caused to alter its course of travel in either an upward or downward direction at any point in the complete cycle of press operation.

It is still a further object of the invention to provide a control device for controlling the operation of a combination clutch and brake mechanism of a mechanical press so as to cause operation of the clutch and brake mechanism at any point in the cycle of operation of the press, and to provide for alteration of the point in the cycle of operation at which the clutch and brake mechanism will function.

These and other objects will become apparent from the drawings and the following description.

Figure 1:
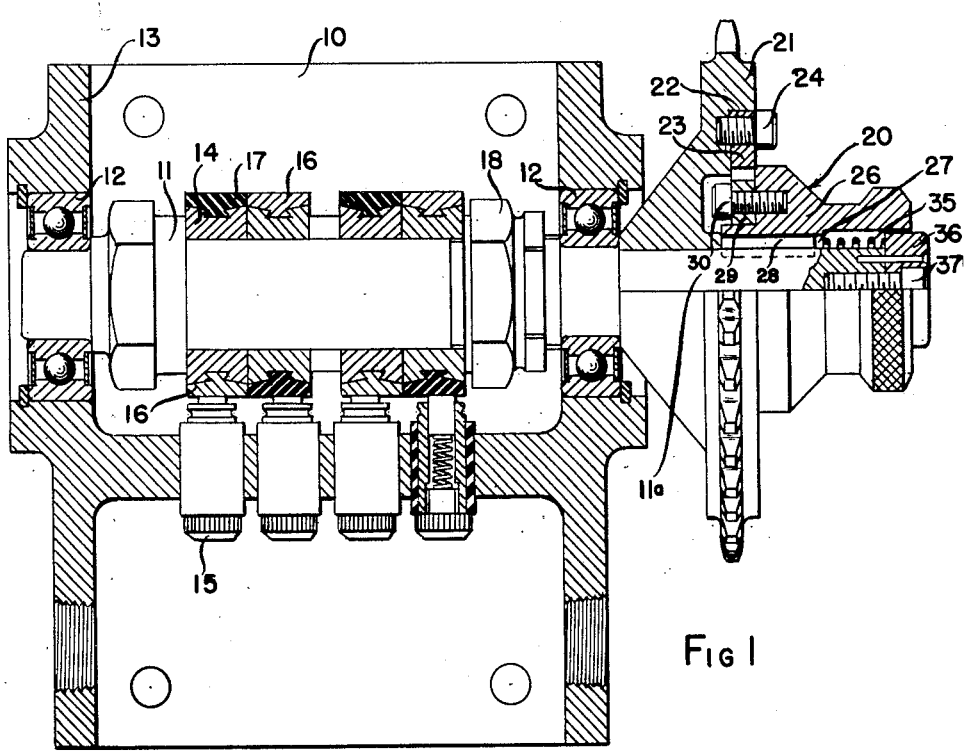
Figure 1 is a cross-sectional view of the device of this invention.

There are many machines that have mechanisms that must be controlled at a particular time during the operation of a complete cycle of the machine, and which point of operation must be altered to meet varying circumstances when producing various articles. It is the usual practice to provide time cycle controllers for controlling the operation of the mechanism in relation to the full cycle of operation of the machine.

In this invention there is provided an adjusting mechanism for the time cycle controller by which the point at which the time cycle controller will render the controlled mechanism effective can be adjusted relative to the full cycle of operation of the machine to cause the controller to become effective at any point in the cycle of operation of the machine.

For example, in the operation of a mechanical press it is essential that the cooperating clutch and brake mechanism be operated at the top of the stroke of the platen of the the press to halt the press at its upper position. The time during which the press is halted varies under varying circumstances, and it is particularly desirable that a positive halt be made at the top of the stroke to insure positive stopping of the press in the event of some mechanical difficulty. Thus, it is advisable to cause operation of the combination clutch and brake mechanism at the end of each stroke, and yet be able to accomplish this function without greatly retarding the normal speed of operation of the press.

As the speed of operation of mechanical presses increases it becomes more difficult to perform this operation for the time period during which the press is actually stopped at the top of its stroke becomes less and less as the strokes of the press increase per minute. Therefore, it becomes essential to provide a mechanism by which the point of operation of the control for regulating the combination clutch and brake can adjust the controller to cause it to cause operation of the clutch and brake mechanism at a particular point in the cycle of operation of the press, which point may be varied from time to time, depending on operating conditions.

In this invention, there is disclosed a rotary controller 10 that consists of a drive shaft 11 journaled in the bearings 12 of a controller casing 13.

The drive shaft 11 is provided with a plurality of contacter rings 14 each of which is engaged by a current-carrying brush mechanism 15. The contacter rings 14 are provided with semi-circular current conducting segments 16 and insulating segments 17. The current-conducting segments 16 are in side-by-side engagement so that rotation of the rings 14 relative to one another will adjust the current-conducting time between cooperating pairs of brushes 15.

The rings 14 may be adjusted relative to one another by loosening the nut 18 so that the rings 14 can be moved manually relative to one another for any current-conducting time desired, whereupon the nut 18 is tightened and the controller is set for operation.

Under normal circumstances, a rotary controller of this type is driven in unison with the press so that the brake and clutch mechanism of the mechanical press will be operated at the desired moment in the cycle of operation of the press. Conventionally, the current controlled by the rotary switch 10 operates a solenoid valve which controls the air supply to the combination clutch and brake mechanism whereby to cause it to function during the period of current conduction by the switch mechanism.

It is desirable to regulate the point at which the control mechanism 10 will be rendered effective relative to the total stroke of the press. This function is provided for by the adjusting mechanism 20.

The adjusting mechanism 20 is carried upon the shaft extension 11a, which is a part of the shaft 11 and extends from the switch casing 13. In the drawing the shaft extension 11a is shown integral with the shaft 11, but in so far as this invention is concerned, it need not be an integral shaft, but shaft 11a can be a separate shaft element and suitably secured to the shaft 11, as by a threaded connection. Thus, the adjusting device 20 can be constructed as a completely independent element that can be installed on any rotary controller.

The adjusting device 20 consists of a sprocket gear 21 that is journalled on the shaft 11a for free rotation thereon. The sprocket gear 21 has the usual sprocket teeth and is adapted to be chain-driven from the mechanism that is controlled by the controller. However, other suitable gear arrangements can be used for positive drive of the controller.

The sprocket gear 21 is provided with a recess 22 that receives a tooth ring 23 that is removably secured to the sprocket gear 21 by means of the cap-screws 24. The tooth ring 23 is provided with a plurality of serrations or teeth 25 on the inner periphery thereof. These teeth may be of any desired size.

A clutch element 26 is journalled on the shaft 11a and is provided with a key slot 27 that receives a key 28 projecting from the shaft 11a. The clutch element 26 is non-rotative on the shaft 11a, but is axially movable thereon.

The clutch element 26 carries a tooth ring 29 removably secured thereto by means of the cap-screws 30. This tooth ring 29 has teeth 31 on the exterior periphery thereof that cooperate with the teeth 25 on the inner periphery of the tooth ring 23, and are adapted to be in tooth engagement therewith, as shown in Figures 1 and 3.

A coil spring 35 is placed around the shaft 11a and has one end thereof bearing against the member 26 and the opposite end thereof bearing against a stop member 36 secured to the end of the shaft 11a by means of the screw 37. The spring 35 continuously urges the member 26 toward the sprocket gear 21 or drive member, whereby the teeth 25 and 31 are held in tooth engagement.

Figures 2, 3:
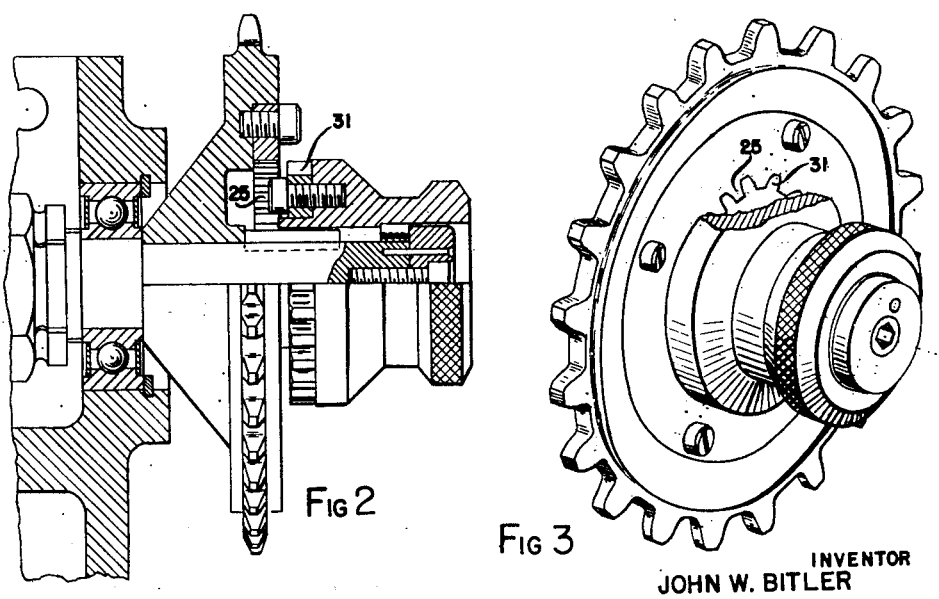
Figure 2 is a cross-sectional view of a portion of the device illustrating it in disengaged position.
Figure 3 is a perspective elevational view of the device of this invention.

When the device is in the position shown in Figs. 1 and 3, the shaft 11a will be driven from the sprocket gear 21 through the member 26.

From the foregoing description it will be apparent that the controller 10 being positively driven from the controlled device, rotation of the current conducting segments of the controller will be in a definite relationship to the cycle of the controlled device.

If it is desired to change the relationship between the controlled device and the current-conducting segments of the controller, so that they will effect operation of the controlled device at a different point in the complete cycle of operation of it, the clutch member 26 can be pulled outwardly against the spring 35, as shown in Fig. 2, whereupon the shaft 11a can be rotated by rotation of the clutch member 26, the gear 21 remaining in a fixed position, which represents a certain fixed position in the cycle of operation of the controlled device since it is directly connected to it.

With the current-conducting segments rotated relative to the gear 21, the current-conducting segments will cause operation of the controlled device at a different point in the cycle of operation of the device.

By making the teeth 25 and 31 either fine or coarse, various degrees of adjustment can be obtained.

It will be noted that the member 26 projects over the cooperating teeth 25 and 31, thus providing a dirt-shield for the adjusting teeth.

While the apparatus disclosed and described herein constitutes a preferred form of the invention, yet it will be understood that mechanical alterations can be made in the device without departing from the spirit of the invention, and that modifications that fall within the scope of the appended claims are intended to be included herein.

Having thus fully described my invention, what I claim as new and desire to secure by Letters Patent is:

1. A time cycle control mechanism comprising, a casing, a rotatable shaft having one end thereof in said casing and the opposite end exteriorly of said casing, a cycle control mechanism on said end of said shaft within said casing, a drive gear journalled on the exteriorly disposed end of said shaft and freely rotatable thereon with said shaft extending through said gear with the end thereof projecting beyond the gear, said gear being adapted for driving connection from a device being controlled by the time cycle control for synchronization therewith, a second member having a body portion journalled on the said projecting end of said shaft and keyed on said shaft for rotation therewith and axially slidable on said shaft, cooperating teeth ring members on said drive gear and the body portion of said second member having the teeth thereof held in cooperating engagement, and resilient means between the said projecting end of said shaft and said second member continuously urging the same toward said drive gear to normally maintain the said teeth ring members in cooperating tooth engagement whereby said drive gear will drive said shaft through said second member, said second member including an end portion projecting from said body portion at said projecting end of said shaft for hand grasping for manual axial movement thereof for disconnection of said teeth rings and manual relative rotation therebetween whereby to change the fixed position of said shaft relative to said drive gear.

2. A time cycle control mechanism including, a casing, a rotatable shaft having one end thereof in said casing and the opposite end exteriorly of said casing, a cycle control mechanism mounted on said end of said shaft within said casing for rotation therewith, a drive gear journalled on the exteriorly disposed end of said shaft and freely rotatable thereon with said shaft extending through said gear with the end thereof projecting beyond the gear, said gear being adapted for driving connection from a device being controlled by the cycle control for synchronization therewith, said drive gear having an internal gear, a second member having a body portion journalled on said projecting end of said shaft and keyed thereto for rotation therewith but axially slidable on said shaft, said body portion of said second member including external gear means in meshing engagement with said internal gear, said second member having an axial recess therein providing a space between said projecting end of said shaft and said second member, an enlargement on the said projecting end of said shaft and positioned within said recess, spring means disposed in said space with one end engaging said enlargement and the opposite end engaging said second member urging said second member toward said gear to normally maintain engagement between said internal gear and said external gear, and an end portion on said second member projecting from said body portion at said projecting end of said shaft forming a hand grasping portion for manual axial movement of said second member relative to said gear for disconnection of said external gear from said internal gear and manual relative rotation therebetween to change the radial position of said shaft relative to said gear.

JOHN W. BITLER.

References Cited in the file of this patent

UNITED STATES PATENTS

| Number | Name | Date |
|---|---|---|
| 276,688 | Hartley | May 1, 1883 |
| 414,593 | Scott | Nov. 5, 1889 |
| 1,545,684 | Nutt et al. | July 14, 1925 |
| 2,011,822 | Munschauer | Aug. 20, 1935 |
| 2,427,310 | Schumaker | Sept. 9, 1947 |